US009674791B2

(12) United States Patent
Li

(10) Patent No.: US 9,674,791 B2
(45) Date of Patent: Jun. 6, 2017

(54) WIRELESS COMMUNICATION METHOD, APPARATUS, AND SYSTEM

(71) Applicant: Huawei Technologies Co., Ltd., Shenzhen (CN)

(72) Inventor: Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/757,677

(22) Filed: Dec. 23, 2015

(65) Prior Publication Data

US 2016/0127999 A1   May 5, 2016

Related U.S. Application Data

(63) Continuation of application No. PCT/CN2013/084010, filed on Sep. 23, 2013.

(30) Foreign Application Priority Data

Jun. 24, 2013  (WO) ............... PCT/CN2013/077786

(51) Int. Cl.
*H04W 52/14* (2009.01)
*H04L 5/14* (2006.01)
(Continued)

(52) U.S. Cl.
CPC ......... *H04W 52/146* (2013.01); *H04L 5/1469* (2013.01); *H04W 52/16* (2013.01); *H04W 52/54* (2013.01); *H04W 72/042* (2013.01)

(58) Field of Classification Search
None
See application file for complete search history.

(56) References Cited

U.S. PATENT DOCUMENTS 8,494,572 B2 *  7/2013  Chen ............... H04W 52/16
                                                    370/318
9,386,565 B2 *  7/2016  Yang ............... H04L 1/1861
(Continued)

FOREIGN PATENT DOCUMENTS

CN    102201859 A    9/2011
CN    102340858 A    2/2012
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, V10.2.0, pp. 1-120, 3rd Generation Partnership Project, Valbonne, France (Jun. 2011).

*Primary Examiner* — Eunsook Choi
(74) *Attorney, Agent, or Firm* — Leydig, Voit & Mayer, Ltd.

(57) ABSTRACT

Embodiments of the present invention provide a wireless communication method, an apparatus, and a system. The method includes: receiving, by UE in a fixed downlink subframe whose subframe number is $i-K_{UL}$, at least one TPC command sent by a base station, where the at least one TPC command is carried on a PDCCH whose format is a DCI format 3/3A, and the at least one TPC command includes a TPC command of an uplink signal that is sent in an uplink subframe whose subframe number is i; determining, by the UE according to the TPC command of the uplink signal that is sent in the uplink subframe whose subframe number is i, a problem that in a scenario in which a dynamic TDD uplink-downlink subframe configuration is applied, a base station fails to receive an uplink signal.

14 Claims, 3 Drawing Sheets

(51) Int. Cl.
*H04W 52/16* (2009.01)
*H04W 52/54* (2009.01)
*H04W 72/04* (2009.01)

(56) References Cited

U.S. PATENT DOCUMENTS

| | | |
|---|---|---|
| 2013/0114562 A1 | 5/2013 | Seo et al. |
| 2014/0029486 A1 | 1/2014 | Li et al. |
| 2015/0304967 A1 | 10/2015 | Kim et al. |
| 2015/0358916 A1* | 12/2015 | Park .................... H04W 72/042 455/522 |
| 2016/0029239 A1* | 1/2016 | Sadeghi ................ H04W 24/10 370/252 |

FOREIGN PATENT DOCUMENTS

| | | |
|---|---|---|
| CN | 102612129 A | 7/2012 |
| CN | 102740477 A | 10/2012 |
| CN | 102742331 A | 10/2012 |
| CN | 102761948 A | 10/2012 |
| EP | 2496026 A2 | 9/2012 |
| JP | 2011520335 A | 7/2011 |
| JP | 2013038790 A | 2/2013 |
| WO | WO 2011162156 A1 | 12/2011 |
| WO | WO 2012060434 A1 | 5/2012 |
| WO | WO 2013004007 A1 | 1/2013 |
| WO | WO 2013014332 A1 | 1/2013 |

* cited by examiner

WIRELESS COMMUNICATION METHOD, APPARATUS, AND SYSTEM

CROSS-REFERENCE TO RELATED APPLICATIONS

This application is a continuation of International Patent Application No. PCT/CN2013/084010, filed on Sep. 23, 2013, which claims priority to International Patent Application No. PCT/CN2013/077786, filed on Jun. 24, 2013, both of which are hereby incorporated by reference in their entireties.

TECHNICAL FIELD

Embodiments of the present invention relate to the field of communications technologies, and in particular, to a wireless communication method, an apparatus, and a system.

BACKGROUND

A Long Term Evolution (LTE) system supports a time division duplex (TDD) mode, that is, different timeslots of a same frequency are used for an uplink and a downlink. To meet requirements of different uplink-downlink asymmetric services, in an LTE TDD system, an uplink-downlink configuration may be configured in a semi-static manner according to a service type. However, the uplink-downlink configuration that is used is configured in a semi-static manner and cannot be changed dynamically. Therefore, the current uplink-downlink configuration does not match transient uplink and downlink service volumes. As a result, resources cannot be used effectively. The problem is especially serious for a cell with a relatively small quantity of users. In the prior art, to resolve the foregoing problem, a concept of a dynamic TDD uplink-downlink subframe configuration is introduced. That is, some flexible subframes are configured in a radio frame, where each flexible subframe may be dynamically configured as an uplink subframe or a downlink subframe.

In the prior art, when sending an uplink signal, user equipment (UE) needs to configure transmit power of the uplink signal according to a transmit power control command (TPC) notified by a base station, so that the uplink signal meets a requirement of receive power of the base station after arriving at the base station (Evolved NodeB, eNB). When a TPC command sent by a base station is carried on a physical downlink control channel (PDCCH) whose format is a downlink control information format 3/3A (DCI format 3/3A), UE cannot acquire a TPC command of an uplink signal at any moment and can acquire the TPC command of the uplink signal only according to a time sequence relationship predefined by a standard, because currently a strict time sequence relationship exists between the DCI format 3/3A and the uplink signal indicated by the DCI format 3/3A.

Therefore, in a scenario in which a dynamic TDD uplink-downlink subframe configuration is applied, when a subframe that sends the DCI format 3/3A is dynamically configured as an uplink subframe, UE cannot acquire a TPC command required for sending an uplink signal. As a result, a base station fails to receive the uplink signal.

SUMMARY

Embodiments of the present invention provide a wireless communication method, an apparatus, and a system, to resolve a problem that in a scenario in which a dynamic TDD uplink-downlink subframe configuration is applied, a base station fails to receive an uplink signal.

According to a first aspect, an embodiment of the present invention provides a wireless communication method, including:

receiving, in a fixed downlink subframe whose subframe number is $i-K_{UL}$, at least one transmit power control TPC command sent by a base station, where the at least one TPC command is carried on a physical downlink control channel PDCCH whose format is a downlink control information format DCI format 3/3A, and the at least one TPC command includes a TPC command of an uplink signal that is sent in an uplink subframe whose subframe number is i, where different TPC commands are used to indicate transmit power of uplink signals that are sent in different uplink subframes;

determining, according to the TPC command of the uplink signal that is sent in the uplink subframe whose subframe number is i, transmit power of the uplink signal that is sent in the uplink subframe whose subframe number is i, where the uplink subframe whose subframe number is i is the $(K_{UL})^{th}$ subframe that is after the fixed downlink subframe whose subframe number is $i-K_{UL}$, where a value of $K_{UL}$ is independent of a time division duplex TDD system uplink-downlink subframe configuration; and sending, according to the transmit power, the uplink signal in the subframe whose subframe number is i.

In a first possible implementation manner of the first aspect, before the receiving, in a fixed downlink subframe whose subframe number is $i-K_{UL}$, at least one transmit power control TPC command sent by a base station, the method further includes:

receiving a first TPC-radio network temporary identifier TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiving, in a fixed downlink subframe whose subframe number is $i-K_{UL}$, at least one transmit power control TPC command sent by a base station includes:

receiving, in the fixed downlink subframe whose subframe number is $i-K_{UL}$, the first PDCCH and/or the second PDCCH that are/is sent by the base station, and acquiring the first TPC command from the first PDCCH, and/or acquiring the second TPC command from the second PDCCH.

With reference to the first aspect, in a second possible implementation manner of the first aspect, before the receiving, in a fixed downlink subframe whose subframe number is $i-K_{UL}$, at least one transmit power control TPC command sent by a base station, the method further includes:

receiving a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving, in a fixed downlink subframe whose subframe number is $i-K_{UL}$, at least one transmit power control TPC command sent by a base station includes:

receiving, in the fixed downlink subframe whose subframe number is $i-K_{UL}$, the third PDCCH that is sent by the base station, and acquiring the first TPC command from the location indicated by the first TPC index, and/or acquiring the second TPC command from the location indicated by the second TPC index.

With reference to any one of the first aspect to the second possible implementation manner of the first aspect, in a third possible implementation manner of the first aspect, when the uplink signal is a physical uplink shared channel PUSCH, a physical uplink control channel PUCCH, or a sounding reference signal SRS, the value of $K_{UL}$ includes the following cases:

when i is 2 or 7, $K_{UL}=6$; when i is 3 or 8, $K_{UL}=8$; and when i is 4 or 9, $K_{UL}=4$; or when i is 2, 3, 7 or 8, $K_{UL}=7$; and when i is 4 or 9, $K_{UL}=8$; or when i is 2 or 7, $K_{UL}=7$;
when i is 3, $K_{UL}=7$ or $K_{UL}=12$;
when i is 4, $K_{UL}=4$ or $K_{UL}=9$;
when i is 8, $K_{UL}=12$ or $K_{UL}=7$; and
when i is 9, $K_{UL}=9$ or $K_{UL}=4$.

With reference to any one of the first aspect to the second possible implementation manner of the first aspect, in a fourth possible implementation manner of the first aspect, when the uplink signal is the PUSCH, the PUCCH, or the SRS, the value of $K_{UL}$ includes the following cases:

when i is 2 or 7, $K_{UL}=6$; when i is 3 or 8, $K_{UL}=7$; and when i is 4 or 9, $K_{UL}=4$.

With reference to either of the third possible implementation manner of the first aspect and the fourth possible implementation manner of the first aspect, in a fifth possible implementation manner of the first aspect, when the uplink signal is the SRS, if the PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i includes:

determining, according to each TPC command, transmit power of the PUSCH in the subframe whose subframe number is i; and determining, according to the transmit power of the PUSCH in the subframe whose subframe number is i, transmit power of the SRS in the subframe whose subframe number is i; or if no PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i includes:

determining, according to each TPC command, transmit power of the SRS in the subframe whose subframe number is i.

With reference to any one of the first aspect to the second possible implementation manner of the first aspect, in a sixth possible implementation manner of the first aspect, when the uplink signal is the PUCCH, the PUCCH is sent only in a fixed uplink subframe, and the value of $K_{UL}$ includes:

$K_{UL}=6$ or $K_{UL}=7$.

According to a second aspect, an embodiment of the present invention provides a wireless communication method, including:

sending, in a fixed downlink subframe whose subframe number is i-$K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is independent of a time division duplex TDD system uplink-downlink subframe configuration; where the at least one TPC command is carried on a physical downlink control channel PDCCH whose format is a downlink control information format DCI format 3/3A, and the at least one TPC command includes the TPC command of the uplink signal that is sent in the uplink subframe whose subframe number is i, where different TPC commands are used to indicate transmit power of uplink signals that are sent in different uplink subframes; and receiving, in the subframe whose subframe number is i, the uplink signal sent by the UE.

In a first possible implementation manner of the second aspect, before the sending, in a fixed downlink subframe whose subframe number is i-$K_{UL}$, at least one transmit power control TPC command to user equipment UE, the method further includes:

sending a first TPC-radio network temporary identifier TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending, in a fixed downlink subframe whose subframe number is i-$K_{UL}$, at least one transmit power control TPC command to user equipment UE includes:

sending, in the fixed downlink subframe whose subframe number is i-$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

With reference to the second aspect, in a second possible implementation manner of the second aspect, before the sending, in a fixed downlink subframe whose subframe number is i-$K_{UL}$, at least one transmit power control TPC command to user equipment UE, the method further includes:

sending a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending, in a fixed downlink subframe whose subframe number is i-$K_{UL}$, at least one transmit power control TPC command to user equipment UE includes:

sending, in the fixed downlink subframe whose subframe number is i-$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

With reference to any one of the second aspect to the second possible implementation manner of the second aspect, in a third possible implementation manner of the second aspect, when the uplink signal is a physical uplink shared channel PUSCH, a physical uplink control channel PUCCH, or a sounding reference signal SRS, the value of $K_{UL}$ includes the following cases:

when i is 2 or 7, $K_{UL}$=6; when i is 3 or 8, $K_{UL}$=8; and when i is 4 or 9, $K_{UL}$=4; or when i is 2, 3, 7 or 8, $K_{UL}$=7; and when i is 4 or 9, $K_{UL}$=8; or when i is 2 or 7, $K_{UL}$=7;
when i is 3, $K_{UL}$=7 or $K_{UL}$=12;
when i is 4, $K_{UL}$=4 or $K_{UL}$=9;
when i is 8, $K_{UL}$=12 or $K_{UL}$=7; and
when i is 9, $K_{UL}$=9 or $K_{UL}$=4.

With reference to any one of the second aspect to the second possible implementation manner of the second aspect, in a fourth possible implementation manner of the second aspect, when the uplink signal is the PUSCH, the PUCCH, or the SRS, the value of $K_{UL}$ includes the following cases:

when i is 2 or 7, $K_{UL}$=6; when i is 3 or 8, $K_{UL}$=7; and when i is 4 or 9, $K_{UL}$=4.

With reference to any one of the second aspect to the second possible implementation manner of the second aspect, in a fifth possible implementation manlier of the second aspect, when the uplink signal is the PUCCH, the value of $K_{UL}$ includes:

the PUCCH is sent only in a fixed uplink subframe; and $K_{UL}$=6 or $K_{UL}$=7.

According to a third aspect, an embodiment of the present invention provides user equipment, including:

a receiving module, configured to receive, in a fixed downlink subframe whose subframe number is i-$K_{UL}$, at least one transmit power control TPC command sent by a base station, where the at least one TPC command is carried on a physical downlink control channel PDCCH whose format is a downlink control information format DCI format 3/3A, and the at least one TPC command includes a TPC command of an uplink signal that is sent in an uplink subframe whose subframe number is i, where different TPC commands are used to indicate transmit power of uplink signals that are sent in different uplink subframes;

a processing module, configured to determine, according to the TPC command of the uplink signal that is sent in the uplink subframe whose subframe number is i, transmit power of the uplink signal that is sent in the uplink subframe whose subframe number is i, where the uplink subframe whose subframe number is i is the $(K_{UL})^{th}$ subframe that is after the fixed downlink subframe whose subframe number is i-$K_{UL}$, where a value of $K_{UL}$ is independent of a time division duplex TDD system uplink-downlink subframe configuration; and a sending module, configured to send, according to the transmit power, the uplink signal in the subframe whose subframe number is i.

In a first possible implementation manner of the third aspect, the receiving module is further configured to:

before the at least one transmit power control TPC command sent by the base station is received in the fixed downlink subframe whose subframe number is i-$K_{UL}$, receive a first TPC-radio network temporary identifier TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiving module is configured to:

receive, in the fixed downlink subframe whose subframe number is i-$K_{UL}$, the first PDCCH and/or the second PDCCH that are/is sent by the base station, and acquire the first TPC command from the first PDCCH, and/or acquire the second TPC command from the second PDCCH.

With reference to the third aspect, in a second possible implementation manner of the third aspect, the receiving module is further configured to:

before the at least one transmit power control TPC command sent by the base station is received in the fixed downlink subframe whose subframe number is i-$K_{UL}$, receive a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving module is configured to:

receive, in the fixed downlink subframe whose subframe number is i-$K_{UL}$, the third PDCCH that is sent by the base station, and acquire the first TPC command from the location indicated by the first TPC index, and/or acquire the second TPC command from the location indicated by the second TPC index.

With reference to any one of the third aspect to the second possible implementation manner of the third aspect, in a third possible implementation manner of the third aspect, when the uplink signal is a physical uplink shared channel PUSCH, a physical uplink control channel PUCCH, or a sounding reference signal SRS, the value of $K_{UL}$ includes the following cases:

when i is 2 or 7, $K_{UL}$=6; when i is 3 or 8, $K_{UL}$=8; and when i is 4 or 9, $K_{UL}$=4; or when i is 2, 3, 7 or 8, $K_{UL}$=7; and when i is 4 or 9, $K_{UL}$=8; or when i is 2 or 7, $K_{UL}$=7;
when i is 3, $K_{UL}$=7 or $K_{UL}$=12;
when i is 4, $K_{UL}$=4 or $K_{UL}$=9;
when i is 8, $K_{UL}$=12 or $K_{UL}$=7; and
when i is 9, $K_{UL}$=9 or $K_{UL}$=4.

With reference to any one of the third aspect to the second possible implementation manner of the third aspect, in a fourth possible implementation manner of the third aspect, when the uplink signal is the PUSCH, the PUCCH, or the SRS, the value of $K_{UL}$ includes the following cases:

when i is 2 or 7, $K_{UL}$=6; when i is 3 or 8, $K_{UL}$=7; and when i is 4 or 9. $K_{UL}$=4.

With reference to either of the third possible implementation manner of the third aspect and the fourth possible implementation manner of the third aspect, in a fifth possible implementation manner of the third aspect, when the uplink signal is the SRS, if the PUSCH is sent in the subframe whose subframe number is i, the processing module is configured to:

determine, according to each TPC command, transmit power of the PUSCH in the subframe whose subframe number is i; and determine, according to the transmit power of the PUSCH in the subframe whose subframe number is i, transmit power of the SRS in the subframe whose subframe number is i; or if no PUSCH is sent in the subframe whose subframe number is i, the processing module is configured to:

determine, according to each TPC command, transmit power of the SRS in the subframe whose subframe number is i.

With reference to any one of the third aspect to the second possible implementation manner of the third aspect, in a sixth possible implementation manner of the third aspect, when the uplink signal is the PUCCH, the PUCCH is sent only in a fixed uplink subframe, and the value of $K_{UL}$ includes:

$K_{UL}=6$ or $K_{UL}=7$.

According to a fourth aspect, an embodiment of the present invention provides a base station, including:

a sending module, configured to send, in a fixed downlink subframe whose subframe number is $i-K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is independent of a time division duplex TDD system uplink-downlink subframe configuration; where the at least one TPC command is carried on a physical downlink control channel PDCCH whose format is a downlink control information format DCI format 3/3A, and the at least one TPC command includes the TPC command of the uplink signal that is sent in the uplink subframe whose subframe number is i, where different TPC commands are used to indicate transmit power of uplink signals that are sent in different uplink subframes; and a receiving module, configured to receive, in the subframe whose subframe number is i, the uplink signal sent by the UE.

In a first possible implementation manner of the fourth aspect, the sending module is further configured to:

before the at least one transmit power control TPC command is sent to the user equipment UE in the fixed downlink subframe whose subframe number is $i-K_{UL}$, send a first TPC-radio network temporary identifier TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending module is configured to:

send, in the fixed downlink subframe whose subframe number is $i-K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

With reference to the fourth aspect, in a second possible implementation manner of the fourth aspect, the sending module is further configured to:

before the at least one transmit power control TPC command is sent to the user equipment UE in the fixed downlink subframe whose subframe number is $i-K_{UL}$, send a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending module is configured to:

send, in the fixed downlink subframe whose subframe number is $i-K_{UL}$, the third PDCCH to the UE, so that after the UE receives the third PDCCH, the UE acquires the first TPC command from the location indicated by the first TPC index, and/or acquires the second TPC command from the location indicated by the second TPC index.

With reference to the fourth aspect to the second possible implementation manner of the fourth aspect, in a third possible implementation manner of the fourth aspect, when the uplink signal is a physical uplink shared channel PUSCH, a physical uplink control channel PUCCH, or a sounding reference signal SRS, the value of $K_{UL}$ includes the following cases:

when i is 2 or 7, $K_{UL}=6$; when i is 3 or 8, $K_{UL}=8$; and when i is 4 or 9, $K_{UL}=4$; or when i is 2, 3, 7 or 8, $K_{UL}=7$; and when i is 4 or 9, $K_{UL}=8$; or when i is 2 or 7, $K_{UL}=7$;
when i is 3, $K_{UL}=7$ or $K_{UL}=12$;
when i is 4, $K_{UL}=4$ or $K_{UL}=9$;
when i is 8, $K_{UL}=12$ or $K_{UL}=7$; and
when i is 9, $K_{UL}=9$ or $K_{UL}=4$.

With reference to the fourth aspect to the second possible implementation manner of the fourth aspect, in a fourth possible implementation manner of the fourth aspect, when the uplink signal is the PUSCH, the PUCCH, or the SRS, the value of $K_{UL}$ includes the following cases:

when i is 2 or 7, $K_{UL}=6$; when i is 3 or 8, $K_{UL}=7$; and when i is 4 or 9, $K_{UL}=4$.

With reference to the fourth aspect to the second possible implementation manner of the fourth aspect, in a fifth possible implementation manner of the fourth aspect, when the uplink signal is the PUCCH, the value of $K_{UL}$ includes:

the PUCCH is sent only in a fixed uplink subframe; and $K_{UL}=6$ or $K_{UL}=7$.

According to a sixth aspect, an embodiment of the present invention provides a wireless communication method, including:

receiving, in a fixed downlink subframe whose subframe number is $i-K_{UL}$, at least one transmit power control TPC command sent by a base station, where the at least one TPC command is carried on a physical downlink control channel PDCCH whose format is a downlink control information format DCI format 3/3A, and the at least one TPC command includes a TPC command of an uplink signal that is sent in an uplink subframe whose subframe number is i, where different TPC commands are used to indicate transmit power of uplink signals that are sent in different uplink subframes, and the uplink signal is a physical uplink shared channel PUSCH or a sounding reference signal SRS;

determining, according to the TPC command of the uplink signal that is sent in the uplink subframe whose subframe number is i, transmit power of the uplink signal that is sent in the uplink subframe whose subframe number is i, where the uplink subframe whose subframe number is i is the $(K_{UL})^{th}$ subframe that is after the fixed downlink subframe whose subframe number is $i-K_{UL}$, where a value of $K_{UL}$ is a value defined in time division duplex TDD configuration 0; and sending, according to the transmit power, the uplink signal in the subframe whose subframe number is i.

In a first possible implementation manner of the sixth aspect, that a value of $K_{UL}$ is a value defined in time division duplex TDD configuration 0 includes:

when i is 2 or 7, $K_{UL}=6$; when i is 3 or 8, $K_{UL}=8$; and when i is 4 or 9, $K_{UL}=4$.

With reference to the sixth aspect or the first possible implementation manner of the sixth aspect, in a second possible implementation manner of the sixth aspect, before the receiving, in a fixed downlink subframe whose subframe number is $i-K_{UL}$, at least one transmit power control TPC command sent by a base station, the method further includes:

receiving a first TPC-radio network temporary identifier TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiving, in a fixed downlink subframe whose subframe number is $i-K_{UL}$, at least one transmit power control TPC command sent by a base station includes:

receiving, in the fixed downlink subframe whose subframe number is $i-K_{UL}$, the first PDCCH and/or the second PDCCH that are/is sent by the base station, and acquiring the first TPC command from the first PDCCH, and/or acquiring the second TPC command from the second PDCCH.

With reference to the sixth aspect or the first possible implementation manner of the sixth aspect, in a third possible implementation manner of the sixth aspect, before the receiving, in a fixed downlink subframe whose subframe number is $i-K_{UL}$, at least one transmit power control TPC command sent by a base station, the method further includes:

receiving a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving, in a fixed downlink subframe whose subframe number is $i-K_{UL}$, at least one transmit power control TPC command sent by a base station includes:

receiving, in the fixed downlink subframe whose subframe number is $i-K_{UL}$, the third PDCCH that is sent by the base station, and acquiring the first TPC command from the location indicated by the first TPC index, and/or acquiring the second TPC command from the location indicated by the second TPC index.

With reference to any one of the sixth aspect to the third possible implementation manner of the sixth aspect, in a fourth possible implementation manner of the sixth aspect, when the uplink signal is the SRS, if the PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i includes:

determining, according to each TPC command, transmit power of the PUSCH in the subframe whose subframe number is i; and determining, according to the transmit power of the PUSCH in the subframe whose subframe number is i, transmit power of the SRS in the subframe whose subframe number is i; or if no PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i includes:

determining, according to each TPC command, transmit power of the SRS in the subframe whose subframe number is i.

According to a seventh aspect, an embodiment of the present invention provides a wireless communication method, including:

sending, in a fixed downlink subframe whose subframe number is $i-K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is a value defined in time division duplex TDD configuration 0, and the uplink signal is a physical uplink shared channel PUSCH or a sounding reference signal SRS; where the at least one TPC command is carried on a physical downlink control channel PDCCH whose format is a downlink control information format DCI format 3/3A, and the at least one TPC command includes the TPC command of the uplink signal that is sent in the uplink subframe whose subframe number is i, where different TPC commands are used to indicate transmit power of uplink signals that are sent in different uplink subframes; and receiving, in the subframe whose subframe number is i, the uplink signal sent by the UE.

In a first possible implementation manner of the seventh aspect, that a value of $K_{UL}$ is a value defined in time division duplex TDD configuration 0 includes:

when i is 2 or 7, $K_{UL}=6$; when i is 3 or 8, $K_{UL}=8$; and when i is 4 or 9, $K_{UL}=4$.

With reference to the seventh aspect or the first possible implementation manner of the seventh aspect, in a second possible implementation manner of the seventh aspect, before the sending, in a fixed downlink subframe whose subframe number is $i-K_{UL}$, at least one transmit power control TPC command to user equipment UE, the method further includes:

sending a first TPC-radio network temporary identifier TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending, in a fixed downlink subframe whose subframe number is $i-K_{UL}$, at least one transmit power control TPC command to user equipment UE includes:

sending, in the fixed downlink subframe whose subframe number is $i-K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

With reference to the seventh aspect or the first possible implementation manner of the seventh aspect, in a third possible implementation manner of the seventh aspect, before the sending, in a fixed downlink subframe whose subframe number is $i-K_{UL}$, at least one transmit power control TPC command to user equipment UE, the method further includes:

sending a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending, in a fixed downlink subframe whose subframe number is i-$K_{UL}$, at least one transmit power control TPC command to user equipment UE includes:

sending, in the fixed downlink subframe whose subframe number is i-$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

According to an eighth aspect, an embodiment of the present invention provides user equipment, including:

a receiving module, configured to receive, in a fixed downlink subframe whose subframe number is i-$K_{UL}$, at least one transmit power control TPC command sent by a base station, where the at least one TPC command is carried on a physical downlink control channel PDCCH whose format is a downlink control information format DCI format 3/3A, and the at least one TPC command includes a TPC command of an uplink signal that is sent in an uplink subframe whose subframe number is i, where different TPC commands are used to indicate transmit power of uplink signals that are sent in different uplink subframes, and the uplink signal is a physical uplink shared channel PUSCH or a sounding reference signal SRS;

a processing module, configured to: determine, according to the TPC command of the uplink signal that is sent in the uplink subframe whose subframe number is i, transmit power of the uplink signal that is sent in the uplink subframe whose subframe number is i is the $(K_{UL})^{th}$ subframe that is after the fixed downlink subframe whose subframe number is i-$K_{UL}$, where a value of $K_{UL}$ is a value defined in time division duplex TDD configuration 0; and a sending module, configured to send, according to the transmit power, the uplink signal in the subframe whose subframe number is i.

In a first possible implementation manner of the eighth aspect, that a value of $K_{UL}$, is a value defined in time division duplex TDD configuration 0 includes:

when i is 2 or 7, $K_{UL}$=6; when i is 3 or 8, $K_{UL}$=8; and when i is 4 or 9, $K_{UL}$=4.

With reference to the eighth aspect or the first possible implementation manner of the eighth aspect, in a second possible implementation manner of the eighth aspect, the receiving module is further configured to: before the at least one transmit power control TPC command sent by the base station is received in the fixed downlink subframe whose subframe number is i-$K_{UL}$, receive a first TPC-radio network temporary identifier TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiving module is configured to:

receive, in the fixed downlink subframe whose subframe number is i-$K_{UL}$, the first PDCCH and/or the second PDCCH that are/is sent by the base station, and acquire the first TPC command from the first PDCCH, and/or acquire the second TPC command from the second PDCCH.

With reference to the eighth aspect or the first possible implementation manner of the eighth aspect, in a third possible implementation manner of the eighth aspect, the receiving module is further configured to: before the at least one transmit power control TPC command sent by the base station is received in the fixed downlink subframe whose subframe number is i-$K_{UL}$, receive a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving module is configured to:

receive, in the fixed downlink subframe whose subframe number is i-$K_{UL}$, the third PDCCH that is sent by the base station, and acquire the first TPC command from the location indicated by the first TPC index, and/or acquire the second TPC command from the location indicated by the second TPC index.

With reference to any one of the eighth aspect to the third possible implementation manner of the eighth aspect, in a fourth possible implementation manner of the eighth aspect, when the uplink signal is the SRS, if the PUSCH is sent in the subframe whose subframe number is i, according to the TPC command of the uplink signal that is sent in the uplink subframe whose subframe number is i, the processing module is configured to:

determine, according to each TPC command, transmit power of the PUSCH in the subframe whose subframe number is i; and determine, according to the transmit power of the PUSCH in the subframe whose subframe number is transmit power of the SRS in the subframe whose subframe number is i; or if no PUSCH is sent in the subframe whose subframe number is i, the processing module is configured to:

determine, according to each TPC command, transmit power of the SRS in the subframe whose subframe number is i.

According to a ninth aspect, an embodiment of the present invention provides a base station, including:

a sending module, configured to send, in a fixed downlink subframe whose subframe number is i-$K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is a value defined in time division duplex TDD configuration 0, and the uplink signal is a physical uplink shared channel PUSCH or a sounding reference signal SRS; where the at least one TPC command is carried on a physical downlink control channel PDCCH whose format is a downlink control information format DCI format 3/3A, and the at least one TPC command includes the TPC command of the uplink signal that is sent in the uplink subframe whose subframe number is i, where different TPC commands are used to indicate transmit power of uplink signals that are sent in different uplink subframes; and a receiving module, configured to receive, in the subframe whose subframe number is i, the uplink signal sent by the UE.

In a first possible implementation manner of the ninth aspect, that a value of $K_{UL}$ is a value defined in time division duplex TDD configuration 0 includes:

when i is 2 or 7, $K_{UL}$=6; when i is 3 or 8, $K_{UL}$=8; and when i is 4 or 9, $K_{UL}$=4.

With reference to the ninth aspect or the first possible implementation manner of the ninth aspect, in a second possible implementation manner of the ninth aspect, the sending module is further configured to:

before the at least one transmit power control TPC command is sent to the user equipment UE in the fixed downlink subframe whose subframe number is i–$K_{UL}$, send a first TPC-radio network temporary identifier TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending module is configured to:

send, in the fixed downlink subframe whose subframe number is i–$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

With reference to the ninth aspect or the first possible implementation manner of the ninth aspect, in a third possible implementation manner of the ninth aspect, the sending module is further configured to:

before the at least one transmit power control TPC command is sent to the user equipment UE in the fixed downlink subframe whose subframe number is i–$K_{UL}$, send a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending module is configured to:

send, in the fixed downlink subframe whose subframe number is i–$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

According to a tenth aspect, an embodiment of the present invention provides a communications system, including the user equipment according to any one of the eighth aspect to the fourth possible implementation manner of the eighth aspect and the base station according to any one of the ninth aspect to the third possible implementation manner of the ninth aspect.

According to the wireless communication method, the apparatus, and the system that are provided in the embodiments of the present invention, UE receives, in a fixed downlink subframe whose subframe number is i–$K_{UL}$ at least one TPC command sent by a base station, where the TPC command is carried on a PDCCH whose format is a DCI format 3/3A; next, the UE determines, according to each TPC command, transmit power of an uplink signal, in a subframe whose subframe number is i, corresponding to each TPC command, where the subframe whose subframe number is i is the $(K_{UL})^{th}$ subframe that is after the fixed downlink subframe whose subframe number is i–$K_{UL}$; and finally, the UE sends, according to the transmit power of each uplink signal, each corresponding uplink signal in the subframe whose subframe number is i. Because the UE receives a TPC command only in a fixed downlink subframe, and a flexible downlink subframe does not carry a TPC command, a problem that a TPC command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in the embodiments, so that the UE can acquire TPC commands in different uplink subframes according to the time sequence relationship.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
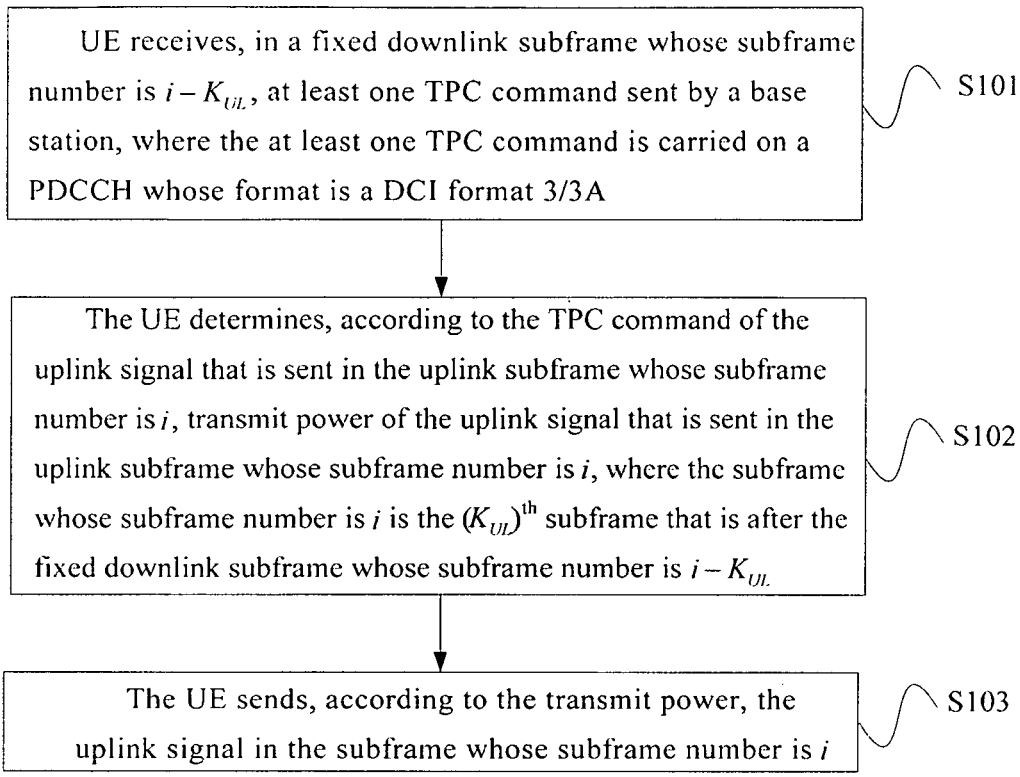
FIG. 1 is a flowchart of Embodiment 1 of a wireless communication method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the embodiments of the present invention, it should be noted first that, a time domain in a system includes radio frames, and a radio frame is identified by a system frame number. In the system, a subframe is identified by a system frame number and a subframe number in each radio frame.

A current TDD system supports seven uplink-downlink subframe configurations. As listed in the following Table 1, 'D' represents a downlink subframe, 'U' represents an uplink subframe, and 'S' represents a special subframe, where 'S' is mainly used for downlink transmission. For UE supporting evolution versions (for example, LTE Rel-12 and later versions), the system can dynamically notify the UE of different uplink-downlink subframe configurations, which may be seven existing configurations, or may be newly added uplink-downlink subframe configurations.

TABLE 1

| Uplink-downlink configu-rations | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It should be further noted that, a fixed subframe in the embodiments of the present invention refers to a subframe whose subframe attribute remains unchanged, that is, a subframe whose subframe attribute does not vary with an uplink-downlink configuration. A fixed subframe is always an uplink subframe, a downlink subframe, or a special subframe, referred to as a fixed uplink subframe, a fixed downlink subframe, and a fixed special subframe respectively. A flexible subframe in the embodiments of the present invention refers to a subframe whose subframe attribute can be dynamically changed, and a flexible subframe can be configured as at least two of an uplink subframe, a downlink subframe, a special subframe, and a null subframe. For example, a flexible subframe refers to a subframe that can be dynamically configured as an uplink subframe or a downlink subframe, or a flexible subframe refers to a subframe that can be dynamically configured as an uplink subframe, a downlink subframe, or a special subframe. A null subframe refers to a subframe that sends neither uplink data nor downlink data. A flexible subframe configured as an uplink subframe is referred to as a flexible uplink subframe, a flexible subframe configured as a downlink subframe is referred to as a flexible downlink subframe, a flexible subframe configured as a special subframe is referred to as a flexible special subframe, and a flexible subframe configured as a null subframe is referred to as a flexible null subframe.

In the present invention, a fixed subframe and a flexible subframe may be determined according to an uplink-downlink subframe configuration supported by an existing version system and an evolved version system. For example, when both an existing system and an evolved system support only the seven uplink-downlink configurations in the foregoing Table 1, subframes 0, 1, 2, and 5 may be used as fixed subframes, and subframes 3, 4, 6, 7, 8, and 9 may be used as flexible subframes. When both the existing system and the evolved system support only four uplink-downlink subframe configurations 0, 1, 2, and 6, subframes 0, 1, 2, 5, 6, and 7 may be used as fixed subframes, and subframes 3, 4, 8, and 9 may be used as flexible subframes. It should be noted that, a special subframe is mainly used for downlink transmission. Therefore, a special subframe may also be used as a downlink subframe. In this way, when both the existing system and the evolved system notify the UE of one of seven configurations, subframes 0, 1, 2, 5, and 6 may be used as fixed subframes, and subframes 3, 4, 7, 8, and 9 may be used as flexible subframes. In addition, for a primary cell (PCell), a downlink subframe or a special subframe indicated in a SIB1 (first system information block, System Information Block 1) cannot be changed into an uplink subframe. Therefore, the downlink subframe or the special subframe indicated by the SIB1 may be referred to as a fixed downlink subframe. For a secondary cell (SCell), a downlink subframe or a special subframe indicated in a RadioResourceConfig-CommonSCell IE (radio resource configuration common SCell information element) cannot be changed into an uplink subframe. Therefore, the downlink subframe or the special subframe indicated by the RadioResourceConfig-CommonSCell IE may be referred to as a fixed downlink subframe.

FIG. 1 is a flowchart of Embodiment 1 of a wireless communication method according to the present invention. In this embodiment, an example in which the method is executed by UE is used for description. As shown in FIG. 1, the method in this embodiment may include:

S101: The UE receives, in a fixed downlink subframe whose subframe number is $i-K_{UL}$ at least one TPC command sent by a base station, where the at least one TPC command is carried on a PDCCH whose format is a DCI format 3/3A, and the at least one TPC command includes a TPC command of an uplink signal that is sent in an uplink subframe whose subframe number is i, where different TPC commands are used to indicate transmit power of uplink signals that are sent in different uplink subframes.

Specifically, the UE receives the TPC command only in the fixed downlink subframe whose subframe number is $i-K_{UL}$ that is, a flexible downlink subframe does not carry a TPC command. Therefore, a problem that a TPC command cannot be acquired after a flexible subframe changes into an uplink subframe is avoided. However, because a flexible subframe can be configured as an uplink subframe, a quantity of fixed downlink subframes is less than a quantity of all possible uplink subframes (including fixed uplink subframes and flexible subframes that can be configured as uplink subframes). In this way, one fixed downlink subframe may need to carry TPC commands for multiple uplink subframes. In a time sequence relationship provided in this embodiment of the present invention, one fixed downlink subframe may need to carry TPC commands for two flexible uplink subframes, or one fixed downlink subframe may need to carry a TPC command for one flexible uplink subframe and a TPC command for one fixed uplink subframe. When one fixed downlink subframe needs to carry TPC commands for two flexible uplink subframes, or when one fixed downlink subframe may need to carry a TPC command for one flexible uplink subframe and a TPC command for one fixed uplink subframe, there are two possible implementation manners in this embodiment of the present invention:

In a possible implementation manner, before S101, the method further includes:

S104a: The UE receives a first TPC-radio network temporary identifier (TPC-RNTI), a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command.

The first TPC command and the second TPC command are used by the UE to determine transmit power of uplink signals in different subframes. For example, the first TPC command is used by the UE to determine transmit power of an uplink signal in a subframe and the second TPC command is used by the UE to determine transmit power of an uplink signal in a subframe j, where the subframe i and the subframe j are different, and a type of the uplink signal in the subframe j may be different from that of the uplink signal in the subframe i. For example, the uplink signal in the subframe j is a sounding reference signal (SRS), and the uplink signal in the subframe i is a physical uplink shared channel (PUSCH).

When the first TPC-RNTI and the second TPC-RNTI that are configured by the base station are the same, the first TPC command and the second TPC command may be configured as a same TPC command. For such a configuration, one TPC command may be used to indicate transmit power of uplink signals in two flexible uplink subframes. Therefore, control signaling overheads can be reduced.

In this case, S101 is specifically as follows:

S101a: The UE receives, in the fixed downlink subframe whose subframe number is $i-K_{UL}$, the first PDCCH and/or the second PDCCH that are/is sent by the base station, and acquires the first TPC command from the first PDCCH, and/or acquires the second TPC command from the second PDCCH.

Specifically, for example, in the fixed downlink subframe whose subframe number is $i-K_{UL}$, the UE uses the first TPC-RNTI to descramble all possible PDCCHs, then performs decoding, and a PDCCH that passes acyclic redundancy check (CRC) is the first PDCCH that is scrambled by the first TPC-RNTI and whose format is the DCI format 3/3A. Then, the first TPC command is acquired from the first PDCCH.

In a possible implementation manner, before S101, the method further includes:

S104b: The UE receives a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A.

After TPC commands for multiple uplink subframes occur in a same fixed downlink subframe, the base station may configure multiple TPC indexes, which are in a one-to-one correspondence with the TPC commands for the multiple uplink subframes.

Similar to that in the first implementation manner, the first TPC command and the second TPC command are used by the UE to determine transmit power of uplink signals in different subframes. When the first TPC index and the second TPC index that are configured by the base station are the same, the first TPC command and the second TPC command may be configured as a same TPC command. For such a configuration, one TPC command may be used to indicate transmit power of uplink signals in two flexible uplink subframes. Therefore, control signaling overheads can be reduced.

In this case, S101 is specifically as follows:

S101b: The UE receives, in the fixed downlink subframe whose subframe number is $i-K_{UL}$, the third PDCCH that is sent by the base station, and acquires the first TPC command from the location indicated by the first TPC index, and/or acquires the second TPC command from the location indicated by the second TPC index.

Specifically, the third PDCCH whose format is the DCI format 3/3A may carry multiple TPC commands, where locations of the TPC commands are identified by TPC indexes. Therefore, after receiving the TPC indexes, the UE can acquire the TPC commands from corresponding locations.

S102: The UE determines, according to the TPC command of the uplink signal that is sent in the uplink subframe whose subframe number is i, transmit power of the uplink signal that is sent in the uplink subframe whose subframe number is i, where the subframe whose subframe number is i is the $(K_{UL})^{th}$ subframe that is after the fixed downlink subframe whose subframe number is $i-K_{UL}$, and a value of $K_{UL}$ is independent of a TDD system uplink-downlink subframe configuration.

The TDD system uplink-downlink subframe configuration is a TDD uplink-downlink configuration indicated by physical layer signaling, where the physical layer signaling is signaling carried on a PDCCH or an enhanced PDCCH (ePDCCH).

Specifically, the UE determines, according to each TPC command, transmit power of the uplink signal corresponding to each TPC command, where the subframe whose subframe number is i is the $(K_{UL})^{th}$ subframe that is after the fixed downlink subframe whose subframe number is $i-K_{UL}$. For the value of $K_{UL}$, there are the following three possible implementation manners in this embodiment:

In a first possible implementation manner, the value of $K_{UL}$ needs to ensure that a TPC command for a flexible uplink subframe and a TPC command for a fixed uplink subframe are carried in different fixed downlink subframes. This implementation manner is applicable to an uplink signal that is a PUSCH, a PUCCH, or an SRS, and there are three cases for this implementation manner:

First: As listed in the following Table 2, when the subframe number of the subframe i in a radio frame is 2 or 7, $K_{UL}=6$; when i is 3 or 8, $K_{UL}=8$; and when i is 4 or 9, $K_{UL}=4$. The value of $K_{UL}$ in this solution can ensure a minimum time delay between transmission of a TPC command and transmission of an uplink signal, which further ensures timeliness of uplink power control, that is, the UE can acquire a most accurate TPC command.

TABLE 2

| Subframe number | 0 | 1 | 2 | 3 | 4 | 5 | 6 | 7 | 8 | 9 |
|---|---|---|---|---|---|---|---|---|---|---|
| $K_{UL}$ | — | — | 6 | 8 | 4 | — | — | 6 | 8 | 4 |

Second: As listed in the following Table 3, when the subframe number of the subframe i in a radio frame is 2, 3, 7 or 8, $K_{UL}=7$; and when i is 4 or 9, $K_{UL}=8$. When one TPC command can be used for two flexible uplink subframes, the value of $K_{UL}$ in this solution can ensure that two flexible subframes that are nearest to each other use a same TPC command.

TABLE 3

| Subframe number | 0 | 1 | 2 | 3 | 4 | 5 | 6 | 7 | 8 | 9 |
|---|---|---|---|---|---|---|---|---|---|---|
| $K_{UL}$ | — | — | 7 | 7 | 8 | — | — | 7 | 7 | 8 |

Third: As listed in the following Table 4 or Table 5, when the subframe number of the subframe i in a radio frame is 2 or 7, $K_{UL}=7$; when i is 3, $K_{UL}=7$ or $K_{UL}=12$; when i is 4, $K_{UL}=4$ or $K_{UL}=9$; when i is 8, $K_{UL}=12$ or $K_{UL}=7$; and when i is 9, $K_{UL}=9$ or $K_{UL}=4$. When both an existing system and an evolved system support only four uplink-downlink subframe configurations 0, 1, 2, and 6, types of interference suffered by flexible uplink subframes whose subframe numbers are 3 and 8 are similar (that is, interference from a downlink signal in a neighboring cell is the same); the value of $K_{UL}$ in this solution can ensure that the flexible uplink subframes whose subframe numbers are 3 and 8 use a same TPC command.

TABLE 4

| Subframe number | 0 | 1 | 2 | 3 | 4 | 5 | 6 | 7 | 8 | 9 |
|---|---|---|---|---|---|---|---|---|---|---|
| $K_{UL}$ | — | — | 7 | 7 | 4 | — | — | 7 | 12 | 9 |

TABLE 5

| Subframe number | 0 | 1 | 2 | 3 | 4 | 5 | 6 | 7 | 8 | 9 |
|---|---|---|---|---|---|---|---|---|---|---|
| $K_{UL}$ | — | — | 7 | 12 | 9 | — | — | 7 | 7 | 4 |

In a second possible implementation manner, this implementation manner is applicable to an uplink signal that is a PUSCH, a PUCCH, or an SRS. In this implementation manner, a TPC command for a flexible uplink subframe and a TPC command for a fixed uplink subframe may occur in a same subframe. The value of $K_{UL}$ is a value in TDD configuration 0 defined in an existing version, as listed in the following Table 6:

When the subframe number of the subframe i in a radio frame is 2 or 7, $K_{UL}=6$; when i is 3 or 8, $K_{UL}=7$; and when i is 4 or 9, $K_{UL}=4$.

TABLE 6

| Subframe number | 0 | 1 | 2 | 3 | 4 | 5 | 6 | 7 | 8 | 9 |
|---|---|---|---|---|---|---|---|---|---|---|
| $K_{UL}$ | — | — | 6 | 7 | 4 | — | — | 6 | 7 | 4 |

Alternatively, when the subframe number of the subframe i in a radio frame is 2 or 7, $K_{UL}=6$ or $K_{UL}=7$; when i is 3 or 8, $K_{UL}=7$; and when i is 4 or 9, $K_{UL}=4$.

In configuration 0, a TPC command can be sent only in a fixed downlink subframe. Therefore, a time sequence relationship in configuration 0 is used for any TDD configuration (the TDD configuration may be a TDD uplink-downlink configuration indicated by configuration information carried on a physical layer channel), which can resolve a problem that a TPC command cannot be acquired. In this solution, all TDD configurations, in the existing version, of the UE are configured as TDD configuration 0. In this way, forward and backward compatibility can be ensured in a favorable manner.

In the foregoing first and second possible implementation manners, when the uplink signal is an SRS, if a PUSCH is sent in the subframe whose subframe number is i, S102 of determining, according to each TPC command, transmit power of the uplink signal in the subframe whose subframe number is i is specifically:

determining, according to each TPC command, transmit power of a PUSCH in the subframe whose subframe number is i; and determining, according to the transmit power of the PUSCH in the subframe whose subframe number is i, transmit power of the SRS in the subframe whose subframe number is i.

If no PUSCH is sent in the subframe whose subframe number is i, S102 of determining, according to each TPC command, transmit power of the uplink signal in the subframe whose subframe number is i is specifically:

determining, according to each TPC command, transmit power of the SRS in the subframe whose subframe number is i.

In this solution, the foregoing method can achieve that a TPC command for an SRS can still be configured even if a PUSCH is not sent.

In a third possible implementation manner, this implementation manner is applicable to a case in which an uplink signal is only a PUCCH, where the PUCCH is sent only in a fixed uplink subframe, and $K_{UL}=6$ or $K_{UL}=7$.

S103: The UE sends, according to the transmit power, the uplink signal in the subframe whose subframe number is i.

According to the wireless communication method provided in this embodiment, UE receives, in a fixed downlink subframe whose subframe number is i-$K_{UL}$, at least one TPC command sent by a base station, where the TPC command is carried on a PDCCH whose format is a DCI format 3/3A; next, the UE determines, according to each TPC command, transmit power of an uplink signal, in a subframe whose subframe number is i, corresponding to each TPC command, where the subframe whose subframe number is i is the $(K_{UL})^{th}$ subframe that is after the fixed downlink subframe whose subframe number is i-$K_{UL}$; and finally, the UE sends, according to the transmit power of each uplink signal, each corresponding uplink signal in the subframe whose subframe number is i. Because the UE receives a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

Figure 2:
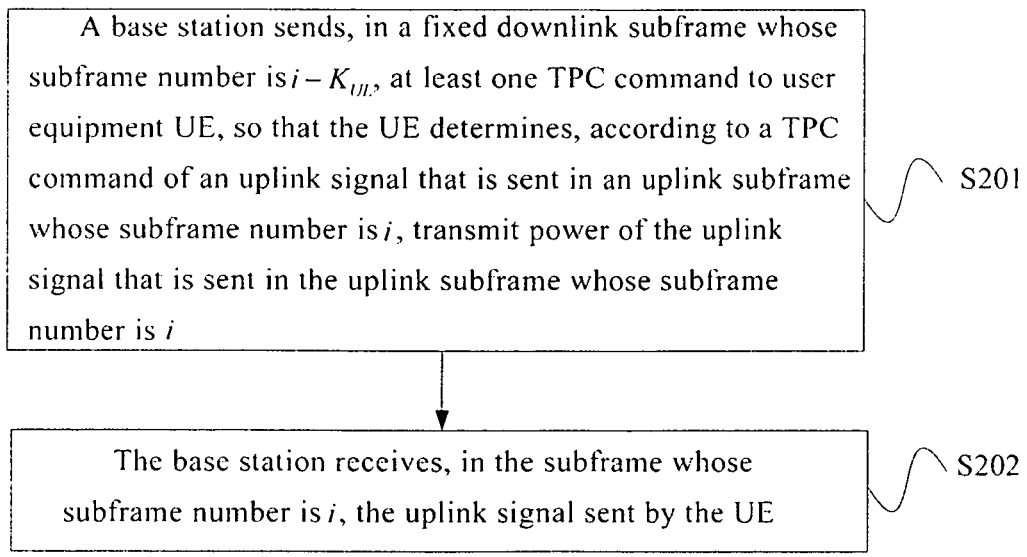
FIG. 2 is a flowchart of Embodiment 2 of a wireless communication method according to the present invention.

FIG. 2 is a flowchart of Embodiment 2 of a wireless communication method according to the present invention. In this embodiment, an example in which the method is executed by a base station is used for description. As shown in FIG. 2, the method in this embodiment may include:

S201: The base station sends, in a fixed downlink subframe whose subframe number is i-$K_{UL}$, at least one TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is independent of a time division duplex TDD system uplink-downlink subframe configuration.

The TDD system uplink-downlink subframe configuration is a TDD uplink-downlink configuration indicated by physical layer signaling, where the physical layer signaling is signaling carried on a PDCCH or an enhanced PDCCH (ePDCCH).

The at least one TPC command is carried on a PDCCH whose format is a DCI format 3/3A, and the at least one TPC command includes the TPC command of the uplink signal that is sent in the uplink subframe whose subframe number is i, where different TPC commands are used to indicate transmit power of uplink signals that are sent in different uplink subframes.

Specifically, the base station sends the TPC command only in the fixed downlink subframe whose subframe number is i-$K_{UL}$ that is, a flexible downlink subframe does not carry a TPC command. Therefore, a problem that a TCP command cannot be acquired after a flexible subframe changes into an uplink subframe is avoided. However, because a flexible subframe can be configured as an uplink subframe, a quantity of fixed downlink subframes is less than a quantity of all possible uplink subframes (including fixed uplink subframes and flexible subframes that can be configured as uplink subframes). In this way, one fixed downlink subframe may need to carry TPC commands for multiple uplink subframes. In a time sequence relationship provided in this embodiment of the present invention, one fixed downlink subframe may need to carry TPC commands for two flexible uplink subframes, or one fixed downlink subframe may need to carry a TPC command for one flexible uplink subframe and a TPC command for one fixed uplink subframe. When one fixed downlink subframe needs to carry TPC commands for two flexible uplink subframes, or when one fixed downlink subframe may need to carry a TPC command for one flexible uplink subframe and a TPC command for one fixed uplink subframe, there are two possible implementation manners in this embodiment of the present invention:

In a possible implementation manner, before S201, the method further includes:

S203a: Send a first TPC-RNTI, a second TPC-RNTI, and first indication information to the UE, where the first indication information is used to indicate that: a first PDCCH that is scrambled by the first TPC-RNTI and whose format is a DCI format 3/3A is used to carry a first TPC command; and a second PDCCH that is scrambled by the second TPC-RNTI and whose format is the DCI format 3/3A is used to carry a second TPC command.

The first TPC command and the second TPC command are used by the UE to determine transmit power of uplink signals in different subframes. When the first TPC-RNTI and the second TPC-RNTI that are configured by the base station are the same, the first TPC command and the second TPC command are a same TPC command. For such a configuration, one TPC command may be used to indicate transmit power of uplink signals in two flexible uplink sub frames. Therefore, control signaling overheads can be reduced.

In this case, S201 is specifically as follows:

S201a: The base station sends, in the fixed downlink subframe whose subframe number is i−$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

In another possible implementation manner, before S201, the method further includes:

S203b: The base station sends a first TPC index, a second TPC index, and second indication information to the UE, where the second indication information is used to indicate that: the first TPC index is used to indicate a location of a first TPC command on a third PDCCH whose format is a DCI format 3/3A, and the second TPC index is used to indicate a location of a second TPC command on the third PDCCH whose format is the DCI format 3/3A.

After TPC commands for multiple uplink subframes occur in a same fixed downlink subframe, the base station may configure multiple TPC indexes, which are in a one-to-one correspondence with the TPC commands for the multiple uplink subframes.

Similar to that in the first implementation manner, the first TPC command and the second TPC command are used by the UE to determine transmit power of uplink signals in different subframes. When the first TPC index and the second TPC index that are configured by the base station are the same, the first TPC command and the second TPC command are a same TPC command. For such a configuration, one TPC command may be used to indicate transmit power of uplink signals in two flexible uplink subframes. Therefore, control signaling overheads can be reduced.

In this case, S201 is specifically as follows:

S201b: Send, in the fixed downlink subframe whose subframe number is i−$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

The subframe whose subframe number is i is the $(K_{UL})^{th}$ subframe that is after the fixed downlink subframe whose subframe number is i−$K_{UL}$. The value of $K_{UL}$ needs to ensure that a TPC command for a flexible uplink subframe and a TPC command for a fixed uplink subframe are carried in different fixed downlink subframes. For the value of $K_{UL}$, there are the following three possible implementation manners in this embodiment:

In a first possible implementation manner, this implementation manner is applicable to an uplink signal that is a PUSCH, a PDCCH, or an SRS, and there are three cases for this implementation manner:

First: As listed in the foregoing Table 2, when the subframe number of the subframe i in a radio frame is 2 or 7, $K_{UL}$=6; when i is 3 or 8 $K_{UL}$=8; and when i is 4 or 9, $K_{UL}$=4. The value of $K_{UL}$ in this solution can ensure a minimum time delay between transmission of a TPC command and transmission of an uplink signal, which further ensures timeliness of uplink power control, that is, the UE can acquire a most accurate TPC command.

Second: As listed in the foregoing Table 3, when the subframe number of the subframe i in a radio frame is 2, 3, 7 or 8, $K_{UL}$=7; and when i is 4 or 9, $K_{UL}$=8. When one TPC command can be used for two flexible uplink subframes, the value of $K_{UL}$ in this solution can ensure that two flexible subframes that are nearest to each other use a same TPC command.

Third: As listed in the foregoing Table 4 or Table 5, when the subframe number of the subframe i in a radio frame is 2 or 7, $K_{UL}$=7; when i is 3, $K_{UL}$=7 or $K_{UL}$=12; when i is 4, $K_{UL}$=4 or $K_{UL}$=9; when i is 8, $K_{UL}$=12 or $K_{UL}$=7; and when i is 9, $K_{UL}$=9 or $K_{UL}$=4. When both an existing system and an evolved system support only four uplink-downlink subframe configurations 0, 1, 2, and 6, types of interference suffered by flexible uplink subframes whose subframe numbers are 3 and 8 are similar (that is, interference from a downlink signal in a neighboring cell is the same); the value of $K_{UL}$ in this solution can ensure that the flexible uplink subframes whose subframe numbers are 3 and 8 use a same TPC command.

In a second possible implementation manner, this implementation manner is applicable to an uplink signal that is a PUSCH, a PUCCH, or an SRS. In this implementation manner, the value of $K_{UL}$ is a value in TDD configuration 0 defined in an existing version, as listed in the foregoing Table 6.

When the subframe number of the subframe i in a radio frame is 2 or 7, $K_{UL}$=6; when i is 3 or 8, $K_{UL}$=7; and when i is 4 or 9, $K_{UL}$=4.

Alternatively, when the subframe number of the subframe i in a radio frame is 2 or 7, $K_{UL}$=6 or $K_{UL}$=7; when i is 3 or 8, $K_{UL}$=7; and when i is 4 or 9, $K_{UL}$=4.

In configuration 0, a TPC command can be sent only in a fixed downlink subframe. Therefore, a time sequence relationship in configuration 0 is used for any TDD configuration (the TDD configuration may be a TDD uplink-downlink configuration indicated by configuration information carried on a physical layer channel), which can resolve a problem that a TPC command cannot be acquired. In this solution, all TDD configurations, in the existing version, of the UE are configured as TDD configuration 0. In this way, forward and backward compatibility can be ensured in a favorable manner.

In a third possible implementation manner, this implementation manner is applicable to a case in which an uplink signal is only a PUCCH, where the PUCCH is sent only in a fixed uplink subframe, and $K_{UL}=6$ or $K_{UL}=7$.

S202: The base station receives, in the subframe whose subframe number is i, the uplink signal sent by the UE.

According to the wireless communication method provided in this embodiment, a base station sends, in a fixed downlink subframe whose subframe number is $i-K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where the subframe whose subframe number is i is the $(K_{UL})^{th}$ subframe that is after the fixed downlink subframe whose subframe number is $i-K_{UL}$. Then, the base station receives, in the subframe whose subframe number is i, the uplink signal sent by the UE. Because the base station sends a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

The technical solutions of the foregoing method embodiments are described in detail in the following by using a specific embodiment.

Figure 3:
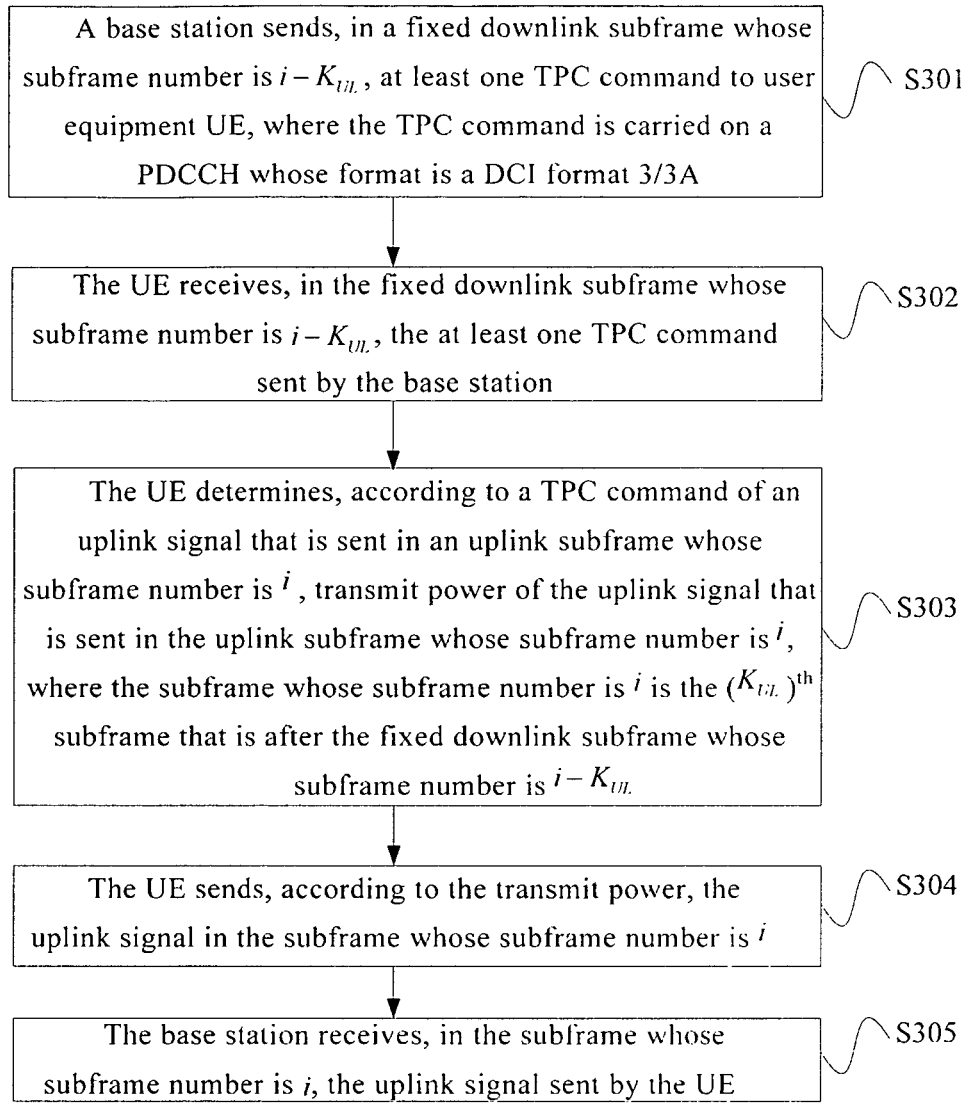
FIG. 3 is a flowchart of Embodiment 3 of a wireless communication method according to the present invention.

FIG. 3 is a flowchart of Embodiment 3 of a wireless communication method according to the present invention. As shown in FIG. 3, an example in which UE and a base station exchange information is used for description in this embodiment; the method in this embodiment may include:

S301: The base station sends, in a fixed downlink subframe whose subframe number is $i-K_{UL}$, at least one TPC command to the user equipment UE, where the TPC command is carried on a PDCCH whose format is a DCI format 3/3A.

S302: The UE receives, in the fixed downlink subframe whose subframe number is $i-K_{UL}$, the at least one TPC command sent by the base station.

S303: The UE determines, according to a TPC command of an uplink signal that is sent in an uplink subframe whose subframe number is i, transmit power of the uplink signal that is sent in the uplink subframe whose subframe number is i, where the subframe whose subframe number is i is the $(K_{UL})^{th}$ subframe that is after the fixed downlink subframe whose subframe number is $i-K_{UL}$; different TPC commands indicate transmit power of uplink signals that are sent in different uplink subframes; a value of $K_{UL}$ is independent of a time division duplex TDD system uplink-downlink subframe configuration; the TDD system uplink-downlink subframe configuration is a TDD uplink-downlink configuration indicated by physical layer signaling, where the physical layer signaling is signaling carried on a PDCCH or an enhanced PDCCH (ePDCCH).

S304: The UE sends, according to the transmit power, the uplink signal in the subframe whose subframe number is i.

S305: The base station receives, in the subframe whose subframe number is i, the uplink signal sent by the UE.

Before S301, when a fixed downlink subframe needs to carry TPC commands for two flexible uplink subframes, a method procedure is changed into the following:

S30a: The base station sends a first TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command.

S301a: The base station sends, in the fixed downlink subframe whose subframe number is $i-K_{UL}$, the first PDCCH and/or the second PDCCH to the UE.

S302a: The UE receives, in the fixed downlink subframe whose subframe number is $i-K_{UL}$, the first PDCCH and/or the second PDCCH that are/is sent by the base station, and acquires the first TPC command from the first PDCCH, and/or acquires the second TPC command from the second PDCCH.

Next, S303, S304, and S305 are executed.

Alternatively, a method procedure is changed into the following:

S30b: The base station sends a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A.

S301b: The base station sends, in the fixed downlink subframe whose subframe number is $i-K_{UL}$, the third PDCCH to the UE.

S302b: The UE receives, in the fixed downlink subframe whose subframe number is $i-K_{UL}$, the third PDCCH that is sent by the base station, and acquires the first TPC command from the location indicated by the first TPC index, and/or acquires the second TPC command from the location indicated by the second TPC index.

Next, S303, S304, and S305 are executed.

The subframe whose subframe number is i is the $(K_{UL})^{th}$ subframe that is after the fixed downlink subframe whose subframe number is $i-K_{UL}$. For the value of $K_{UL}$, there are the following three possible implementation manners in this embodiment:

In a first possible implementation manner, the value of $K_{UL}$ needs to ensure that a TPC command for a flexible uplink subframe and a TPC command for a fixed uplink subframe are carried in different Fixed downlink subframes. This implementation manner is applicable to an uplink signal that is a PUSCH, a PUCCH, or an SRS, and there are three cases for this implementation manner:

First: As listed in the foregoing Table 2, when the subframe number of the subframe i in a radio frame is 2 or 7, $K_{UL}=6$; when i is 3 or 8, $K_{UL}=8$; and when i is 4 or 9, $K_{UL}=4$. The value of $K_{UL}$ in this solution can ensure a minimum time delay between transmission of a TPC command and transmission of an uplink signal, which further ensures timeliness of uplink power control, that is, the UE can acquire a most accurate TPC command.

Second: As listed in the foregoing Table 3, when the subframe number of the subframe i in a radio frame is 2, 3, 7 or 8, $K_{UL}$=7; and when i is 4 or 9, $K_{UL}$=8. When one TPC command can be used for two flexible uplink subframes, the value of $K_{UL}$ in this solution can ensure that two flexible subframes that are nearest to each other use a same TPC command.

Third: As listed in the foregoing Table 4 or Table 5, when the subframe number of the subframe i in a radio frame is 2 or 7, $K_{UL}$=7; when i is 3, $K_{UL}$=7 or $K_{UL}$=12; when i is 4, $K_{UL}$=4 or $K_{UL}$=9; when i is 8, $K_{UL}$=12 or $K_{UL}$=7; and when i is 9, $K_{UL}$=9 or $K_{UL}$=4. When both an existing system and an evolved system support only four uplink-downlink subframe configurations 0, 1, 2, and 6, types of interference suffered by flexible uplink subframes whose subframe numbers are 3 and 8 are similar (that is, interference from a downlink signal in a neighboring cell is the same); the value of $K_{UL}$ in this solution can ensure that the flexible uplink subframes whose subframe numbers are 3 and 8 use a same TPC command.

In a second possible implementation manner, this implementation manner is applicable to an uplink signal that is a PUSCH, a PUCCH, or an SRS. In this implementation manner, a TPC command for a flexible uplink subframe and a TPC command for a fixed uplink subframe may occur in a same subframe. The value of $K_{UL}$ is a value in TDD configuration 0 defined in an existing version, as listed in the foregoing Table 6.

When the subframe number of the subframe i in a radio frame is 2 or 7, $K_{UL}$=6; when i is 3 or 8, $K_{UL}$=7; and when i is 4 or 9, $K_{UL}$=4. Alternatively, when the subframe number of the subframe i in a radio frame is 2 or 7, $K_{UL}$=6 or $K_{UL}$=7; when i is 3 or 8, $K_{UL}$=7; and when i is 4 or 9, $K_{UL}$=4.

In configuration 0, a TPC command can be sent only in a fixed downlink subframe. Therefore, a time sequence relationship in configuration 0 is used for any TDD configuration, which can resolve a problem that a TPC command cannot be acquired. In this solution, all TDD configurations, in the existing version, of the UE are configured as TDD configuration 0. In this way, forward and backward compatibility can be ensured in a favorable manner.

In a third possible implementation manner, this implementation manner is applicable to a case in which an uplink signal is only a PUCCH, where the PUCCH is sent only in a fixed uplink subframe, and $K_{UL}$=6 or $K_{UL}$=7.

Figure 4:
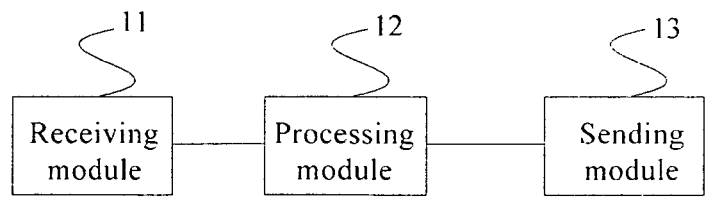
FIG. 4 is a schematic structural diagram of Embodiment 1 of user equipment according to the present invention.

FIG. 4 is a schematic structural diagram of Embodiment 1 of user equipment according to the present invention. As shown in FIG. 4, the apparatus in this embodiment may include: a receiving module 11, a processing module 12, and a sending module 13. The receiving module 11 is configured to receive, in a fixed downlink subframe whose subframe number is i-$K_{UL}$, at least one TPC command sent by a base station, where the at least one TPC command is carried on a physical downlink control channel PDCCH whose format is a DCI format 3/3A, and the at least one TPC command includes a TPC command of an uplink signal that is sent in an uplink subframe whose subframe number is i, where different TPC commands are used to indicate transmit power of uplink signals that are sent indifferent uplink subframes. The processing module 12 is configured to determine, according to the TPC command of the uplink signal that is sent in the uplink subframe whose subframe number is i, transmit power of the uplink signal that is sent in the uplink subframe whose subframe number is i, where the uplink subframe whose subframe number is i is the $(K_{UL})^{th}$ subframe that is after the fixed downlink subframe whose subframe number is i-$K_{UL}$, and a value of $K_{UL}$ is independent of a TDD system uplink-downlink subframe configuration, that is, the fixed downlink subframe whose subframe number is i-$K_{UL}$ occurs prior to the uplink subframe whose subframe number is i, and the two subframes are separated by $K_{UL}$-1 subframes. The TDD system uplink-downlink subframe configuration is a TDD uplink-downlink configuration indicated by physical layer signaling, where the physical layer signaling is signaling carried on a PDCCH or an enhanced PDCCH (ePDCCH). The sending module 13 is configured to send, according to the transmit power, the uplink signal in the subframe whose subframe number is i.

Further, the receiving module 11 is further configured to:

before the at least one transmit power control TPC command sent by the base station is received in the fixed downlink subframe whose subframe number is i-$K_{UL}$, receive a first TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiving module 11 is configured to:

receive, in the fixed downlink subframe whose subframe number is i-$K_{UL}$, the first PDCCH and/or the second PDCCH that are/is sent by the base station, and acquire the first TPC command from the first PDCCH, and/or acquire the second TPC command from the second PDCCH.

Further, optionally, the receiving module 11 is further configured to:

before the at least one transmit power control TPC command sent by the base station is received in the fixed downlink subframe whose subframe number is i-$K_{UL}$, receive a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving module 11 is configured to:

receive, in the fixed downlink subframe whose subframe number is i-$K_{UL}$, the third PDCCH that is sent by the base station, and acquire the first TPC command from the location indicated by the first TPC index, and/or acquire the second TPC command from the location indicated by the second TPC index.

In the foregoing embodiment, when the uplink signal is a PUSCH, a PUCCH, or an SRS; the value of $K_{UL}$ includes the following cases:

when i is 2 or 7, $K_{UL}$=6; when i is 3 or 8, $K_{UL}$=8; and when i is 4 or 9, $K_{UL}$=4; or when i is 2, 3, 7 or 8, $K_{UL}$=7; and when i is 4 or 9, $K_{UL}$=8; or when i is 2 or 7, $K_{UL}$=7;

when i is 3, $K_{UL}$=7 or $K_{UL}$=12;

when i is 4, $K_{UL}$=4 or $K_{UL}$=9;

when i is 8, $K_{UL}$=12 or $K_{UL}$=7; and when i is 9, $K_{UL}$=9 or $K_{UL}$=4.

In the foregoing embodiment, when the uplink signal is a PUSCH, a PUCCH, or an SRS, the value of $K_{UL}$ includes the following cases:

When i is 2 or 7, $K_{UL}$=6; when i is 3 or 8, $K_{UL}$=7; and when i is 4 or 9, $K_{UL}$=4. Alternatively, when the subframe number of the subframe i in a radio frame is 2 or 7, $K_{UL}$=6 or $K_{UL}$=7; when i is 3 or 8, $K_{UL}$=7; and when i is 4 or 9, $K_{UL}$=4.

Further, when the uplink signal is an SRS, if a PUSCH is sent in the subframe whose subframe number is i, the processing module 12 is configured to:

determine, according to each TPC command, transmit power of the PUSCH in the subframe whose subframe number is i; and determine, according to the transmit power of the PUSCH in the subframe whose subframe number is i, transmit power of the SRS in the subframe whose subframe number is i; or if no PUSCH is sent in the subframe whose subframe number is i, the processing module is configured to:

determine, according to each TPC command, transmit power of the SRS in the subframe whose subframe number is i.

In the foregoing embodiment, optionally, when the uplink signal is a PUCCH, the PUCCH is sent only in a fixed uplink subframe, and the value of $K_{UL}$ includes:

$K_{UL}=6$ or $K_{UL}=7$.

The apparatus in this embodiment may be configured to implement the technical solutions in the method embodiment shown in FIG. 1. An implementation principle of the apparatus embodiment is similar to that of the method embodiment, and details are not described herein again.

According to the user equipment provided in this embodiment, a receiving module receives, in a fixed downlink subframe whose subframe number is i-$K_{UL}$, at least one TPC command sent by a base station, where the TPC command is carried on a PDCCH whose format is a DCI format 3/3A; next, a processing module determines, according to each TPC command, transmit power of an uplink signal, in a subframe whose subframe number is i, corresponding to each TPC command, where the subframe whose subframe number is i is the $(K_{UL})^{th}$ subframe that is after the fixed downlink subframe whose subframe number is i-$K_{UL}$; and finally, a sending module sends, according to the transmit power of each uplink signal, each corresponding uplink signal in the subframe whose subframe number is i. Because the UE receives a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

Figure 5:
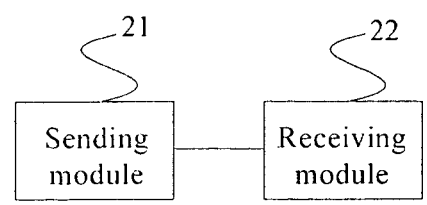
FIG. 5 is a schematic structural diagram of Embodiment 1 of a base station according to the present invention.

FIG. 5 is a schematic structural diagram of Embodiment 1 of a base station according to the present invention. As shown in FIG. 5, the apparatus in this embodiment includes: a sending module 21 and a receiving module 22. The sending module 21 is configured to send, in a fixed downlink subframe whose subframe number is i-$K_{UL}$, at least one TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is independent of a TDD system uplink-downlink subframe configuration. The TDD system uplink-downlink subframe configuration is a TDD uplink-downlink configuration indicated by physical layer signaling, where the physical layer signaling is signaling carried on a PDCCH or an enhanced PDCCH (ePDCCH).

The at least one TPC command is carried on a physical downlink control channel PDCCH whose format is a DCI format 3/3A, and the at least one TPC command includes the TPC command of the uplink signal that is sent in the uplink subframe whose subframe number is i, where different TPC commands are used to indicate transmit power of uplink signals that are sent in different uplink subframes.

The receiving module 22 is configured to receive, in the subframe whose subframe number is i, the uplink signal sent by the UE.

Further, the sending module 21 is further configured to:

before the at least one transmit power control TPC command is sent to user equipment UE in the fixed downlink subframe whose subframe number is i-$K_{UL}$, send a first TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending module 21 is configured to:

send, in the fixed downlink subframe whose subframe number is i-$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

Further, optionally, the sending module 21 is further configured to:

before the at least one transmit power control TPC command is sent to the user equipment UE in the fixed downlink subframe whose subframe number is i-$K_{UL}$, send a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending module 21 is configured to:

send, in the fixed downlink subframe whose subframe number is i-$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

In the foregoing embodiment, when the uplink signal is a PUSCH, a PUCCH, or an SRS, the value of $K_{UL}$ includes the following cases:

When i is 2 or 7, $K_{UL}=6$; when i is 3 or 8, $K_{UL}=8$; and when i is 4 or 9, $K_{UL}=4$; or when i is 2, 3, 7 or 8, $K_{UL}=7$; and when i is 4 or 9, $K_{UL}=8$; or when i is 2 or 7, $K_{UL}=7$;

when i is 3, $K_{UL}=7$ or $K_{UL}=12$;

when i is 4, $K_{UL}=4$ or $K_{UL}=9$;

when i is 8, $K_{UL}=12$ or $K_{UL}=7$; and when i is 9, $K_{UL}=9$ or $K_{UL}=4$.

In the foregoing embodiment, when the uplink signal is a PUSCH, a PUCCH, or an SRS, the value of $K_{UL}$ includes the following cases:

When i is 2 or 7, $K_{UL}=6$; when i is 3 or 8, $K_{UL}=7$; and when i is 4 or 9, $K_{UL}=4$. Alternatively, when the subframe number of the subframe i in a radio frame is 2 or 7, $K_{UL}=6$ or $K_{UL}=7$; when i is 3 or 8, $K_{UL}=7$; and when i is 4 or 9, $K_{UL}=4$.

In the foregoing embodiment, when the uplink signal is a PUCCH, the value of $K_{UL}$ includes:

the PUCCH is sent only in a fixed uplink subframe; and $K_{UL}=6$ or $K_{UL}=7$.

The apparatus in this embodiment may be configured to implement the technical solutions in the method embodiment shown in FIG. 2. An implementation principle and a technical effect of the apparatus embodiment are similar to those of the method embodiment, and details are not described herein again.

According to the base station provided in this embodiment, a sending module sends, in a fixed downlink subframe whose subframe number is $i-K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where the subframe whose subframe number is i is the $(K_{UL})^{th}$ subframe that is after the fixed downlink subframe whose subframe number is $i-K_{UL}$. Then, a receiving module receives, in the subframe whose subframe number is i, the uplink signal sent by the UE. Because the base station sends a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

A communications system provided in an embodiment of the present invention includes the user equipment shown in FIG. 4 and the base station shown in FIG. 5.

Figure 6:
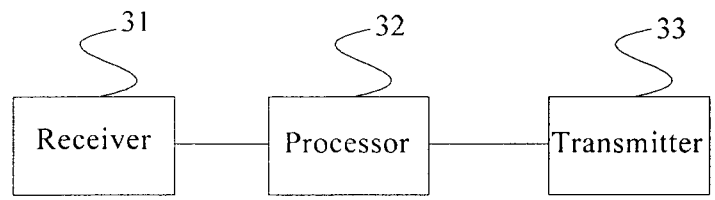
FIG. 6 is a schematic structural diagram of Embodiment 2 of user equipment according to the present invention.

FIG. 6 is a schematic structural diagram of Embodiment 2 of user equipment according to the present invention. As shown in FIG. 6, the apparatus in this embodiment may include: a receiver 31, a processor 32, and a transmitter 33. The receiver 31 is configured to receive, in a fixed downlink subframe whose subframe number is $i-K_{UL}$, at least one TPC command sent by a base station, where the at least one TPC command is carried on a physical downlink control channel PDCCH whose format is a DCI format 3/3A, and the at least one TPC command includes a TPC command of an uplink signal that is sent in an uplink subframe whose subframe number is i, where different TPC commands are used to indicate transmit power of uplink signals that are sent in different uplink subframes. The processor 32 is configured to determine, according to the TPC command of the uplink signal that is sent in the uplink subframe whose subframe number is i, transmit power of the uplink signal that is sent in the uplink subframe whose subframe number is i, where the uplink subframe whose subframe number is i is the $(K_{UL})^{th}$ subframe that is after the fixed downlink subframe whose subframe number is $i-K_{UL}$, and a value of $K_{UL}$ is independent of a TDD system uplink-downlink subframe configuration. The TDD system uplink-downlink subframe configuration is a TDD uplink-downlink configuration indicated by physical layer signaling, where the physical layer signaling is signaling carried on a PDCCH or an enhanced PDCCH (ePDCCH). The transmitter 33 is configured to send, according to the transmit power, the uplink signal in the subframe whose subframe number is i.

Further, the receiver 31 is further configured to:

before the at least one transmit power control TPC command sent by the base station is received in the fixed downlink subframe whose subframe number is $i-K_{UL}$, receive a first TPC-RNTI, a second TPC-RNTI, and first indication information that are sent by the base station, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the receiver 31 is configured to:

receive, in the fixed downlink subframe whose subframe number is $i-K_{UL}$, the first PDCCH and/or the second PDCCH that are/is sent by the base station, and acquire the first TPC command from the first PDCCH, and/or acquire the second TPC command from the second PDCCH.

Further, optionally, the receiver 31 is further configured to:

before the at least one transmit power control TPC command sent by the base station is received in the fixed downlink subframe whose subframe number is $i-K_{UL}$, receive a first TPC index, a second TPC index, and second indication information that are sent by the base station, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiver 31 is configured to:

receive, in the fixed downlink subframe whose subframe number is $i-K_{UL}$, the third PDCCH that is sent by the base station, and acquire the first TPC command from the location indicated by the first TPC index, and/or acquire the second TPC command from the location indicated by the second TPC index.

In the foregoing embodiment, when the uplink signal is a PUSCH, a PUCCH, or an SRS, the value of $K_{UL}$ includes the following cases:

When i is 2 or 7, $K_{UL}=6$; when i is 3 or 8, $K_{UL}=8$; and when i is 4 or 9, $K_{UL}=4$; or when i is 2, 3, 7 or 8, $K_{UL}=7$; and when i is 4 or 9, $K_{UL}=8$; or when i is 2 or 7, $K_{UL}=7$;
when i is 3, $K_{UL}=7$ or $K_{UL}=12$;
when i is 4, $K_{UL}=4$ or $K_{UL}=9$;
when i is 8, $K_{UL}=12$ or $K_{UL}=7$; and
when i is 9, $K_{UL}=9$ or $K_{UL}=4$.

In the foregoing embodiment, when the uplink signal is a PUSCH, a PUCCH, or an SRS, the value of $K_{UL}$ includes the following cases:

When i is 2 or 7, $K_{UL}=6$; when i is 3 or 8, $K_{UL}=7$; and when i is 4 or 9, $K_{UL}=4$. Alternatively, when the subframe number of the subframe i in a radio frame is 2 or 7, $K_{UL}=6$ or $K_{UL}=7$; when i is 3 or 8, $K_{UL}=7$; and when i is 4 or 9, $K_{UL}=4$.

Further, when the uplink signal is an SRS, if a PUSCH is sent in the subframe whose subframe number is i, the processor 32 is configured to:

determine, according to each TPC command, transmit power of the PUSCH in the subframe whose subframe number is i; and determine, according to the transmit power of the PUSCH in the subframe whose subframe number is i, transmit power of the SRS in the subframe whose subframe number is i; or if no PUSCH is sent in the subframe whose subframe number is i, the processing module is configured to:

determine, according to each TPC command, transmit power of the SRS in the subframe whose subframe number is i.

In the foregoing embodiment, optionally, when the uplink signal is a PUCCH, the PUCCH is sent only in a fixed uplink subframe, and the value of $K_{UL}$ includes:

$K_{UL}$=6 or $K_{UL}$=7.

The apparatus in this embodiment may be configured to implement the technical solutions in the method embodiment shown in FIG. 1. An implementation principle of the apparatus embodiment is similar to that of the method embodiment, and details are not described herein again.

According to the user equipment provided in this embodiment, a receiver receives, in a fixed downlink subframe whose subframe number is i-$K_{UL}$, at least one TPC command sent by a base station, where the TPC command is carried on a PDCCH whose format is a DCI format 3/3A; next, a processor determines, according to each TPC command, transmit power of an uplink signal, in a subframe whose subframe number is i, corresponding to each TPC command, where the subframe whose subframe number is i is the $(K_{UL})^{th}$ subframe that is after the fixed downlink subframe whose subframe number is i-$K_{UL}$; and finally, a transmitter sends, according to the transmit power of each uplink signal, each corresponding uplink signal in the subframe whose subframe number is i. Because the UE receives a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

Figure 7:
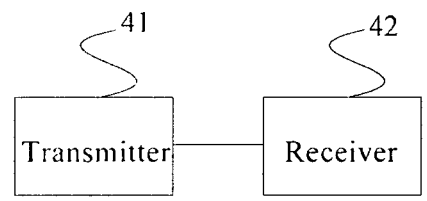
FIG. 7 is a schematic structural diagram of Embodiment 2 of a base station according to the present invention.

FIG. 7 is a schematic structural diagram of Embodiment 2 of a base station according to the present invention. As shown in FIG. 7, the apparatus in this embodiment includes: a transmitter 41 and a receiver 42. The transmitter 41 is configured to send, in a fixed downlink subframe whose subframe number is i-$K_{UL}$, at least one TPC command to user equipment UE, so that the UE determines, according to a TPC command of an uplink signal that is sent in an uplink subframe whose subframe number is i, transmit power of the uplink signal that is sent in the uplink subframe whose subframe number is i, where a value of $K_{UL}$ is independent of a TDD system uplink-downlink subframe configuration. The TDD system uplink-downlink subframe configuration is a TDD uplink-downlink configuration indicated by physical layer signaling, where the physical layer signaling is signaling carried on a PDCCH or an enhanced PDCCH (ePDCCH).

The at least one TPC command is carried on a physical downlink control channel PDCCH whose format is a DCI format 3/3A, and the at least one TPC command includes the TPC command of the uplink signal that is sent in the uplink subframe whose subframe number is i where different TPC commands are used to indicate transmit power of uplink signals that are sent in different uplink subframes.

The receiver 42 is configured to receive, in the subframe whose subframe number is 1, the uplink signal sent by the UE.

Further, the transmitter 41 is further configured to:

before the at least one transmit power control TPC command is sent to user equipment UE in the fixed downlink subframe whose subframe number is i-$K_{UL}$, send a first TPC-RNTI, a second TPC-RNTI, and first indication information to the UE, where the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the transmitter 41 is configured to:

send, in the fixed downlink subframe whose subframe number is i-$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

Further, optionally, the transmitter 41 is further configured to:

before the at least one transmit power control TPC command is sent to the user equipment UE in the fixed downlink subframe whose subframe number is i-$K_{UL}$, send a first TPC index, a second TPC index, and second indication information to the UE, where the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the transmitter 41 is configured to:

send, in the fixed downlink subframe whose subframe number is i-$K_{UL}$, the third PDCCH to the UE, so that after the UE receives the third PDCCH, the UE acquires the first TPC command from the location indicated by the first TPC index, and/or acquires the second TPC command from the location indicated by the second TPC index.

In the foregoing embodiment, when the uplink signal is a PUCCH, a PUCCH, or an SRS, the value of $K_{UL}$ includes the following cases:

When i is 2 or 7, $K_{UL}$=6; when i is 3 or 8, $K_{UL}$=8; and when i is 4 or 9, $K_{UL}$=4; or when i is 2, 3, 7 or 8, $K_{UL}$=7; and when i is 4 or 9, $K_{UL}$=8; or when i is 2 or 7, $K_{UL}$=7;

when i is 3, $K_{UL}$=7 or $K_{UL}$=12;

when i is 4, $K_{UL}$=4 or $K_{UL}$=9;

when i is 8, $K_{UL}$=12 or $K_{UL}$=7; and when i is 9, $K_{UL}$=9 or $K_{UL}$=4.

In the foregoing embodiment, when the uplink signal is a PUSCH, a PUCCH, or an SRS, the value of $K_{UL}$ includes the following cases:

When i is 2 or 7, $K_{UL}$=6; when i is 3 or 8, $K_{UL}$=7; and when i is 4 or 9, $K_{UL}$=4. Alternatively, when the subframe number of the subframe i in a radio frame is 2 or 7, $K_{UL}$=6 or $K_{UL}$=7; when i is 3 or 8, $K_{UL}$=7; and when i is 4 or 9, $K_{UL}$=4.

In the foregoing embodiment, when the uplink signal is a PUCCH, the value of $K_{UL}$ includes:

the PUCCH is sent only in a fixed uplink subframe; and $K_{UL}$=6 or $K_{UL}$=7.

The apparatus in this embodiment may be configured to implement the technical solutions in the method embodiment shown in FIG. 2. An implementation principle and a technical effect of the apparatus embodiment are similar to those of the method embodiment, and details are not described herein again.

According to the base station provided in this embodiment, a transmitter sends, in a fixed downlink subframe whose subframe number is i-$K_{UL}$, at least one transmit power control TPC command to user equipment UE, so that the UE determines, according to a TPC command of an uplink signal that is sent in an uplink subframe whose subframe number is i, transmit power of the uplink signal that is sent in the uplink subframe whose subframe number is i, where the subframe whose subframe number is i is the $(K_{UL})^{th}$ subframe that is after the fixed downlink subframe whose subframe number is i–$K_{UL}$. Then, a receiver receives, in the subframe whose subframe number is i, the uplink signal sent by the UE. Because the base station sends a TPC command only in a fixed downlink subframe, and a flexible downlink subframe does not carry a TPC command, a problem that a TCP command cannot be acquired after a flexible subframe changes into an uplink subframe is avoided. In this way, a problem that the base station fails to receive an uplink signal can be resolved. In addition, a time sequence relationship between sending of a TPC command and sending of an uplink signal is further defined in this embodiment, so that the UE can acquire TPC commands in different uplink subframes according to the time sequence relationship.

A communications system provided in an embodiment of the present invention includes the user equipment shown in FIG. 6 and the base station shown in FIG. 7.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A wireless communication method, comprising:
   receiving a first TPC-radio network temporary identifier (TPC-RNTI), a second TPC-RNTI, and first indication information that are sent by the base station, wherein the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command;
   receiving, in the fixed downlink subframe whose subframe number is i–$K_{UL}$, the first PDCCH and/or the second PDCCH that are/is sent by the base station, and acquiring the first TPC command from the first PDCCH, and/or acquiring the second TPC command from the second PDCCH;
   i–$K_{UL}$
   wherein the at least one TPC command is carried on a physical downlink control channel (PDCCH) in a downlink control information format (DCI format) 3/3A, and the at least one TPC command comprises a TPC command from an uplink signal that is sent in an uplink subframe whose subframe number is i;
   determining, according to the TPC command of the uplink signal that is sent in the uplink subframe whose subframe number is i, the transmit power of the uplink signal that is sent in the uplink subframe whose subframe number is i, wherein the uplink subframe whose subframe number is i is the $(K_{UL})^{th}$ subframe that is after the fixed downlink subframe whose subframe number is i–$K_{UL}$, wherein a value of $K_{UL}$ is a value defined in time division duplex (TDD) configuration 0; and
   sending, according to the transmit power, the uplink signal in the subframe whose subframe number is i, wherein different TPC commands are used to indicate transmit power of uplink signals that are sent in different uplink subframes, and the uplink signal is a physical uplink shared channel (PUSCH) or a sounding reference signal (SRS).

2. The method according to claim 1, wherein that a value of $K_{UL}$ is a value defined in time division duplex (TDD) configuration 0 comprises:
   when i is 2 or 7, $K_{UL}=6$; when i is 3 or 8, $K_{UL}=8$; and when i is 4 or 9, $K_{UL}=4$.

3. The method according to claim 1, wherein before the receiving, in a fixed downlink subframe whose subframe number is $i-K_{UL}$, at least one transmit power control (TPC) command sent by a base station, the method further comprises:

receiving a first TPC index, a second TPC index, and second indication information that are sent by the base station, wherein the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the receiving, in a fixed downlink subframe whose subframe number is $i-K_{UL}$, at least one transmit power control (TPC) command sent by a base station comprises:

receiving, in the fixed downlink subframe whose subframe number is $i-K_{UL}$, the third PDCCH that is sent by the base station, and acquiring the first TPC command from the location indicated by the first TPC index, and/or acquiring the second TPC command from the location indicated by the second TPC index.

4. The method according to claim 1, wherein when the uplink signal is the SRS, if the PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i comprises:

determining, according to each TPC command, transmit power of the PUSCH in the subframe whose subframe number is i; and determining, according to the transmit power of the PUSCH in the subframe whose subframe number is i, transmit power of the SRS in the subframe whose subframe number is i; or if no PUSCH is sent in the subframe whose subframe number is i, the determining, according to the TPC command of the uplink signal that is sent in the uplink subframe whose subframe number is i, transmit power of the uplink signal that is sent in the uplink subframe whose subframe number is i comprises:

determining, according to each TPC command, transmit power of the SRS in the subframe whose subframe number is i.

5. A wireless communication method, comprising:

sending, in a fixed downlink subframe whose subframe number is $i-K_{UL}$, at least one transmit power control (TPC) command to a user equipment (UE), so that the UE may determine, according to a TPC command of an uplink signal that is sent in an uplink subframe whose subframe number is i, transmit power of the uplink signal that is sent in the uplink subframe whose subframe number is i, wherein a value of $K_{UL}$ is a value defined in time division duplex (TDD) configuration 0, and the uplink signal is a physical uplink shared channel (PUSCH) or a sounding reference signal (SRS), wherein the at least one TPC command is carried on a physical downlink control channel (PDCCH) whose format is a downlink control information format (DCI format) 3/3A, and the at least one TPC command comprises the TPC command of the uplink signal that is sent in the uplink subframe whose subframe number is i, wherein different TPC commands are used to indicate transmit power of uplink signals that are sent in different uplink subframes;

receiving, in the subframe whose subframe number is i, the uplink signal sent by the UE; and sending a first TPC-radio network temporary identifier (TPC-RNTI), a second TPC-RNTI, and first indication information to the UE, wherein the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending, in a fixed downlink subframe whose subframe number is $i-K_{UL}$, at least one transmit power control (TPC) command to user equipment (UE) comprises:

sending, in the fixed downlink subframe whose subframe number is $i-K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

6. The method according to claim 5, wherein that a value of $K_{UL}$ is a value defined in time division duplex (TDD) configuration 0 comprises:

when i is 2 or 7, $K_{UL}=6$; when i is 3 or 8, $K_{UL}=8$; and when i is 4 or 9, $K_{UL}=4$.

7. The method according to claim 5, wherein before the sending, in a fixed downlink subframe whose subframe number is $i-K_{UL}$, at least one transmit power control (TPC) command to user equipment (UE), the method further comprises:

sending a first TPC index, a second TPC index, and second indication information to the UE, wherein the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and the sending, in a fixed downlink subframe whose subframe number is $i-K_{UL}$, at least one transmit power control (TPC) command to user equipment (UE) comprises:

sending, in the fixed downlink subframe whose subframe number is $i-K_{UL}$, the third PDCCH to the UE, so that after the UE receives the third PDCCH, the UE acquires the first TPC command from the location indicated by the first TPC index, and/or acquires the second TPC command from the location indicated by the second TPC index.

8. A user equipment, comprising:

a processor; and a non-transitory computer-readable storage medium including computer-executable instructions executed by the processor to perform, on the user equipment, the method comprising:

receiving a first TPC-radio network temporary identifier (TPC-RNTI), a second TPC-RNTI, and first indication information that are sent by the base station, wherein the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command;

receiving, in the fixed downlink subframe whose subframe number is i-$K_{UL}$, the first PDCCH and/or the second PDCCH that are/is sent by the base station, and acquiring the first TPC command from the first PDCCH, and/or acquiring the second TPC command from the second PDCCH;

i-$K_{UL}$, wherein the at least one TPC command is carried on a physical downlink control channel (PDCCH) whose format is a downlink control information format (DCI format) 3/3A, and the at least one TPC command comprises a TPC command of an uplink signal that is sent in an uplink subframe whose subframe number is i;

determining, according to the TPC command of the uplink signal that is sent in the uplink subframe whose subframe number is i, transmit power of the uplink signal that is sent in the uplink subframe whose subframe number is i, wherein the uplink subframe whose subframe number is i is the $(K_{UL})^{th}$ subframe that is after the fixed downlink subframe whose subframe number is i-$K_{UL}$, wherein a value of $K_{UL}$ is a value defined in time division duplex (TDD) configuration 0; and sending according to the transmit power, the uplink signal in the subframe whose subframe number is i, wherein different TPC commands are used to indicate transmit power of uplink signals that are sent in different uplink subframes, and the uplink signal is a physical uplink shared channel (PUSCH) or a sounding reference signal (SRS).

9. The user equipment according to claim 8, wherein that a value of $K_{UL}$ is a value defined in time division duplex (TDD) configuration 0 comprises:

when i is 2 or 7, $K_{UL}$=6; when i is 3 or 8, $K_{UL}$=8; and when i is 4 or 9, $K_{UL}$=4.

10. The user equipment according to claim 8, further comprising instructions for:

before the at least one transmit power control (TPC) command sent by the base station is received in the fixed downlink subframe whose subframe number is i-$K_{UL}$, receiving a first TPC index, a second TPC index, and second indication information that are sent by the base station, wherein the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and receiving in the fixed downlink subframe whose subframe number is i-$K_{UL}$, the third PDCCH that is sent by the base station, and acquiring the first TPC command from the location indicated by the first TPC index, and/or acquiring the second TPC command from the location indicated by the second TPC index.

11. The user equipment according to claim 8, wherein when the uplink signal is the SRS, if the PUSCH is sent in the subframe whose subframe number is i, according to the TPC command of the uplink signal that is sent in the uplink subframe whose subframe number is i, further comprising instructions for:

determining, according to each TPC command, transmit power of the PUSCH in the subframe whose subframe number is i; and determining, according to the transmit power of the PUSCH in the subframe whose subframe number is i, transmit power of the SRS in the subframe whose subframe number is i; or if no PUSCH is sent in the subframe whose subframe number is i, determining, according to each TPC command, transmit power of the SRS in the subframe whose subframe number is i.

12. A base station, comprising:

a processor; and a non-transitory computer-readable storage medium including computer-executable instructions executed by the processor to perform, on the base station, the method comprising:

sending, in a fixed downlink subframe whose subframe number is i-$K_{UL}$, at least one transmit power control (TPC) command to user equipment (UE), so that the UE determines, according to a TPC command of an uplink signal that is sent in an uplink subframe whose subframe number is i, transmit power of the uplink signal that is sent in the uplink subframe whose subframe number is i, wherein a value of $K_{UL}$ is a value defined in time division duplex (TDD) configuration 0, and the uplink signal is a physical uplink shared channel (PUSCH) or a sounding reference signal (SRS);

wherein the at least one TPC command is carried on a physical downlink control channel (PDCCH) whose format is a downlink control information format (DCI format) 3/3A, and the at least one TPC command comprises the TPC command of the uplink signal that is sent in the uplink subframe whose subframe number is i, wherein different TPC commands are used to indicate transmit power of uplink signals that are sent in different uplink subframes;

receiving, in the subframe whose subframe number is i, the uplink signal sent by the UE; and sending a first TPC-radio network temporary identifier (TPC-RNTI), a second TPC-RNTI, and first indication information to the UE, wherein the first indication information is used to indicate that: a first PDCCH that is scrambled by the first TPC-RNTI and whose format is the DCI format 3/3A is used to carry a first TPC command; and a second PDCCH that is scrambled by the second TPC-RNTI and whose format is the DCI format 3/3A is used to carry a second TPC command; and the sending, in a fixed downlink subframe whose subframe number is i-$K_{UL}$, at least one transmit power control (TPC) command to user equipment (UE) comprises:

sending, in the fixed downlink subframe whose subframe number is i-$K_{UL}$, the first PDCCH and/or the second PDCCH to the UE, so that after the UE receives the first PDCCH and/or the second PDCCH, the UE acquires the first TPC command from the first PDCCH, and/or acquires the second TPC command from the second PDCCH.

13. The base station according to claim 12, wherein that a value of $K_{UL}$ is a value defined in time division duplex (TDD) configuration 0 comprises:

when i is 2 or 7, $K_{UL}$=6; when i is 3 or 8, $K_{UL}$=8; and when i is 4 or 9, $K_{UL}$=4.

14. The base station according to claim 12, further comprising instructions for:
- before the at least one transmit power control (TPC) command is sent to the user equipment (UE) in the fixed downlink subframe whose subframe number is $i-K_{UL}$, sending a first TPC index, a second TPC index, and second indication information to the UE, wherein the second indication information is used to indicate that: the first TPC index is used to indicate a location of a first TPC command on a third PDCCH whose format is the DCI format 3/3A, and the second TPC index is used to indicate a location of a second TPC command on the third PDCCH whose format is the DCI format 3/3A; and
- sending, in the fixed downlink subframe whose subframe number is $i-K_{UL}$, the third PDCCH to the UE, so that after the UE receives the third PDCCH, the UE acquires the first TPC command from the location indicated by the first TPC index, and/or acquires the second TPC command from the location indicated by the second TPC index.

\* \* \* \* \*